United States Patent
Dunbar, Jr.

(10) Patent No.: US 9,009,980 B2
(45) Date of Patent: Apr. 21, 2015

(54) PERFORATED FOOD LADLE

(71) Applicant: Melvin M. Dunbar, Jr., Wahiawa, HI (US)

(72) Inventor: Melvin M. Dunbar, Jr., Wahiawa, HI (US)

( * ) Notice: Subject to any disclaimer, the term of this patent is extended or adjusted under 35 U.S.C. 154(b) by 0 days.

(21) Appl. No.: 14/047,699

(22) Filed: Oct. 7, 2013

(65) Prior Publication Data

US 2014/0033545 A1    Feb. 6, 2014

Related U.S. Application Data

(63) Continuation-in-part of application No. 13/096,872, filed on Apr. 28, 2011, now abandoned.

(60) Provisional application No. 61/344,362, filed on Jul. 6, 2010.

(51) Int. Cl.
*A47J 43/28* (2006.01)

(52) U.S. Cl.
CPC .............. *A47J 43/284* (2013.01); *A47J 43/281* (2013.01)

(58) Field of Classification Search
CPC ........................................................ A47J 43/28
USPC .................... D7/667, 691, 692; 30/324–328
See application file for complete search history.

(56) References Cited

U.S. PATENT DOCUMENTS

| | | | | | |
|---|---|---|---|---|---|
| 19,419 | A | * | 2/1858 | Haines | 30/325 |
| 24,716 | A | * | 7/1859 | Bristol | 30/325 |
| 387,236 | A | * | 8/1888 | Knowlton | 30/325 |
| 769,412 | A | * | 9/1904 | Sidway | 30/325 |
| 990,138 | A | * | 4/1911 | Johnson | 30/325 |
| 1,057,269 | A | | 3/1913 | Prestien | |
| D60,109 | S | * | 12/1921 | Rosen | D7/667 |
| 1,601,613 | A | * | 9/1926 | Fenyves | 30/325 |
| 1,677,120 | A | * | 7/1928 | Rudin | 30/325 |
| D105,670 | S | * | 8/1937 | Nelson | D7/667 |
| D107,958 | S | * | 1/1938 | Hess | D7/667 |
| 2,143,782 | A | * | 1/1939 | Lewy | 30/325 |
| 2,355,130 | A | | 8/1944 | Yerkes | |
| 2,556,092 | A | * | 6/1951 | Kimball | 30/325 |
| 2,603,093 | A | * | 7/1952 | Cordova | 30/324 |
| D194,402 | S | * | 1/1963 | Schlessel | D7/667 |
| 3,149,824 | A | * | 9/1964 | Albano | D7/691 |
| D207,595 | S | * | 5/1967 | Gruber | D7/667 |
| 3,822,020 | A | * | 7/1974 | Hong | D7/691 |
| D236,066 | S | * | 7/1975 | Best | D7/691 |
| D241,301 | S | * | 9/1976 | Harris | D7/667 |
| D268,244 | S | * | 3/1983 | Morin | D7/691 |
| 4,419,103 | A | * | 12/1983 | Balkan | 8/506 |
| D272,118 | S | * | 1/1984 | Steiner | D7/667 |
| D282,708 | S | * | 2/1986 | Schaeffer | D7/667 |
| D292,663 | S | * | 11/1987 | Johnson | D7/691 |
| D293,066 | S | * | 12/1987 | Ferm et al. | D7/692 |

(Continued)

OTHER PUBLICATIONS

Padero World Cuisine 11967-16 perforated One Piece Ladle, Stainless Steel. http//www.buy.com 3 pages; printed from internet Mar. 25, 2010.

*Primary Examiner* — Jason Daniel Prone
(74) *Attorney, Agent, or Firm* — Richard C Litman

(57) ABSTRACT

A perforated food ladle includes a bowl member having a one-quart capacity. The bowl is uniformly perforated throughout its surface area. An elongate handle has its lower end attached to the rim of the bowl. The upper end of the handle terminates in a bend or hook portion. Vertically aligned capacity markings are disposed on the outer surface of the bowl.

1 Claim, 4 Drawing Sheets

(56) References Cited

U.S. PATENT DOCUMENTS

| | | | | |
|---|---|---|---|---|
| D297,202 S | * | 8/1988 | Zumwalt | D7/691 |
| 4,825,551 A | | 5/1989 | Sherblom | |
| D311,852 S | | 11/1990 | Green | |
| D325,327 S | * | 4/1992 | Tam et al. | D7/692 |
| 5,199,349 A | * | 4/1993 | Hansen | 30/325 |
| D337,481 S | * | 7/1993 | Stromberg | D7/667 |
| D339,991 S | * | 10/1993 | Mulry et al. | D7/691 |
| D343,996 S | * | 2/1994 | Hansen | D7/692 |
| 5,347,865 A | * | 9/1994 | Mulry et al. | D7/691 |
| 5,348,023 A | * | 9/1994 | McLucas | 30/325 |
| D433,600 S | * | 11/2000 | Hollinger | D7/565 |
| D440,130 S | * | 4/2001 | Armstrong et al. | D7/691 |
| 6,550,146 B1 | * | 4/2003 | Rouleau | 30/325 |
| D478,484 S | * | 8/2003 | Bull et al. | D7/691 |
| D482,579 S | * | 11/2003 | Kortleven et al. | D7/692 |
| D487,675 S | * | 3/2004 | Overthun et al. | D7/667 |
| D487,678 S | * | 3/2004 | Overthun et al. | D7/691 |
| D503,317 S | * | 3/2005 | Anderson | D7/691 |
| D504,056 S | * | 4/2005 | Craig et al. | D7/691 |
| D519,004 S | * | 4/2006 | Archer | D7/692 |
| D551,522 S | * | 9/2007 | Taylor et al. | D7/667 |
| D595,546 S | * | 7/2009 | LeGreve et al. | D7/691 |
| D598,720 S | * | 8/2009 | Wu | D7/692 |
| D614,374 S | * | 4/2010 | Anderson | D32/53 |
| D627,610 S | * | 11/2010 | Lee et al. | D7/692 |
| D634,591 S | * | 3/2011 | Coppo | D7/691 |
| D649,415 S | * | 11/2011 | Williams | D7/667 |
| D655,980 S | * | 3/2012 | Cheek, Sr. | D7/667 |
| D674,654 S | * | 1/2013 | Sickels et al. | D7/361 |
| D701,419 S | * | 3/2014 | Sickels et al. | D7/361 |
| 2005/0029297 A1 | * | 2/2005 | Hughes | 222/158 |
| 2005/0071980 A1 | * | 4/2005 | Rasmussen et al. | 220/674 |
| 2012/0005903 A1 | * | 1/2012 | Dunbar, Jr. | 30/325 |
| 2012/0207891 A1 | * | 8/2012 | Pantaleo et al. | 99/403 |

* cited by examiner

PERFORATED FOOD LADLE

CROSS-REFERENCE TO RELATED APPLICATION

This application is a continuation-in-part of U.S. utility application Ser. No. 13/096,872, filed Apr. 28, 2011, which application claims the benefit of U.S. Provisional Patent Application Ser. No. 61/344,362, filed Jul. 6, 2010.

BACKGROUND OF THE INVENTION

1. Field of the Invention

The present invention generally relates to culinary utensils, and more particularly to a perforated food ladle for straining liquids from solid food.

2. Description of the Related Art

Large establishments (cafeterias, buffet dining halls, military mess halls, food kitchens, etc.) often require outsized utensils to accomplish the task of preparing food for large numbers of people. Often, the preparation problems occur when the food has to be panned-up for serving. Usually, conventional utensils are too small to accommodate the amount of food necessary to be dipped or ladled for maximum efficiency. This is especially true if liquid must be removed or strained from the food during the panning-up process. The food service industry would certainly embrace a utensil that could contain an adequate amount of food while simultaneously providing means for separating liquid from a solid-liquid food mixture during the panning-up procedure. Thus, a perforated food ladle solving the aforementioned problems is desired.

SUMMARY OF THE INVENTION

The perforated food ladle is a ladle that includes a bowl member having a one-quart capacity. The bowl is uniformly perforated throughout its surface area. Preferably the perforations are angled between 20-45° to the peripheral wall of the bowl. An elongate handle has its lower end attached adjacent the rim of the bowl. The upper end of the handle terminates in a bend or hook portion. Vertically aligned capacity indicia are disposed on the outer surface of the bowl.

Accordingly, the invention presents a perforated ladle having a large capacity to permit maximization of time and effort for food service personnel. The invention provides for improved elements thereof in an arrangement for the purposes described that are inexpensive, dependable and fully effective in accomplishing their intended purposes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
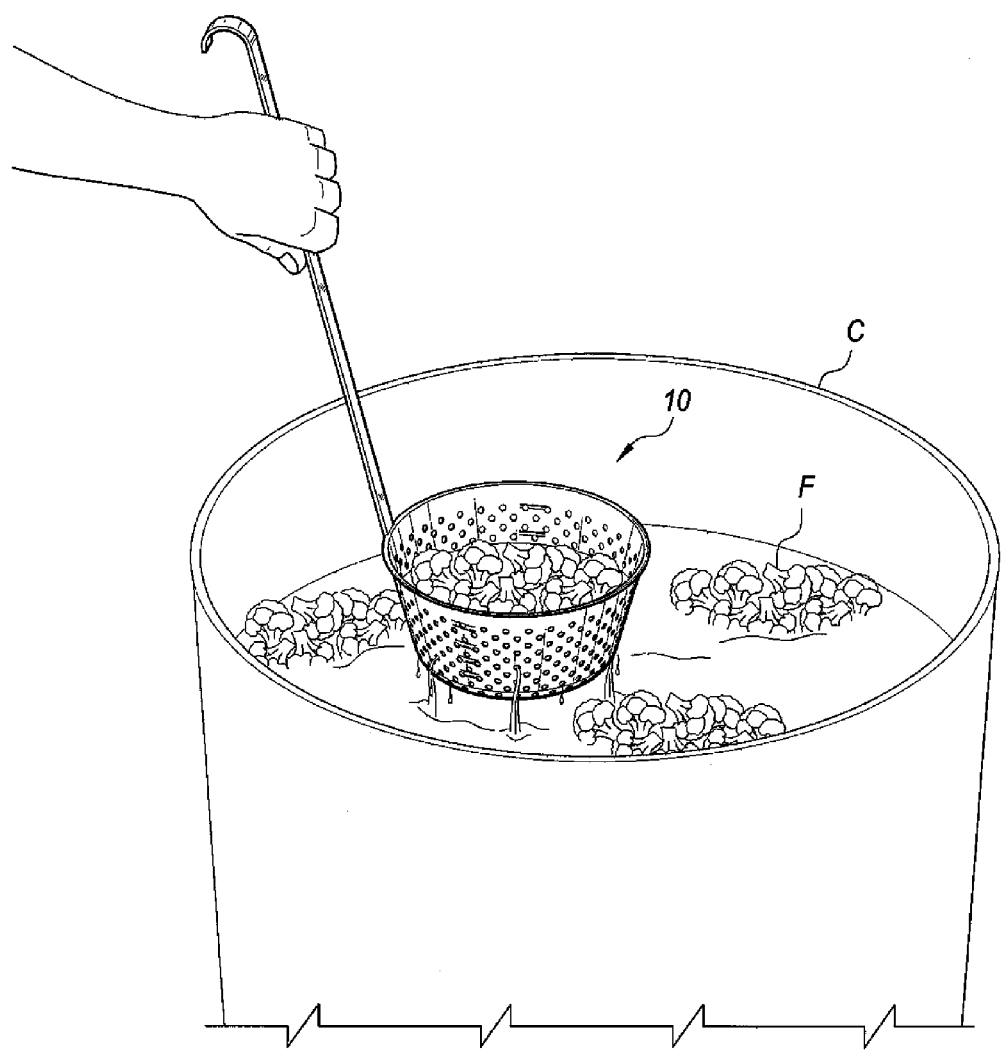
FIG. 1 is an environmental, perspective view of a perforated food ladle according to the present invention.
Figure 2:
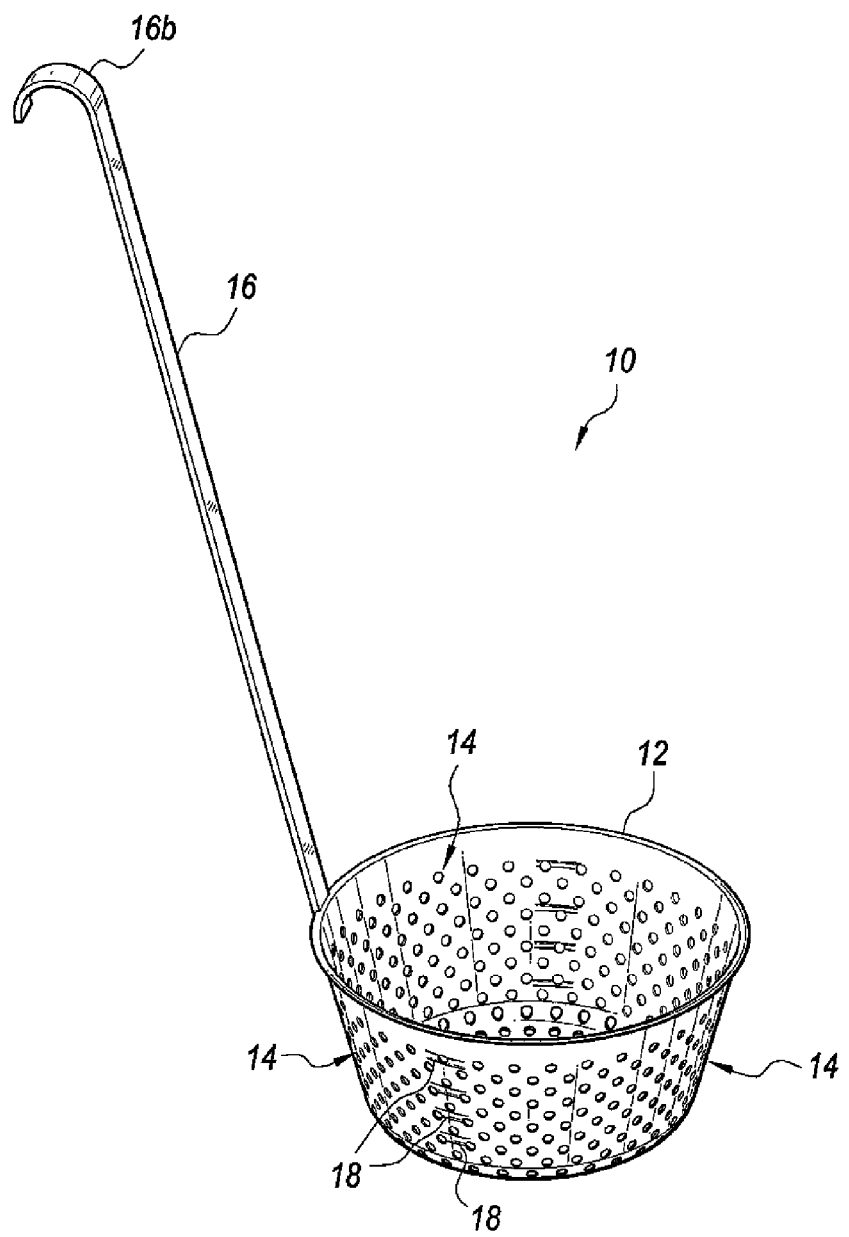
FIG. 2 is a perspective view of a perforated food ladle according to the present invention.
Figure 3:
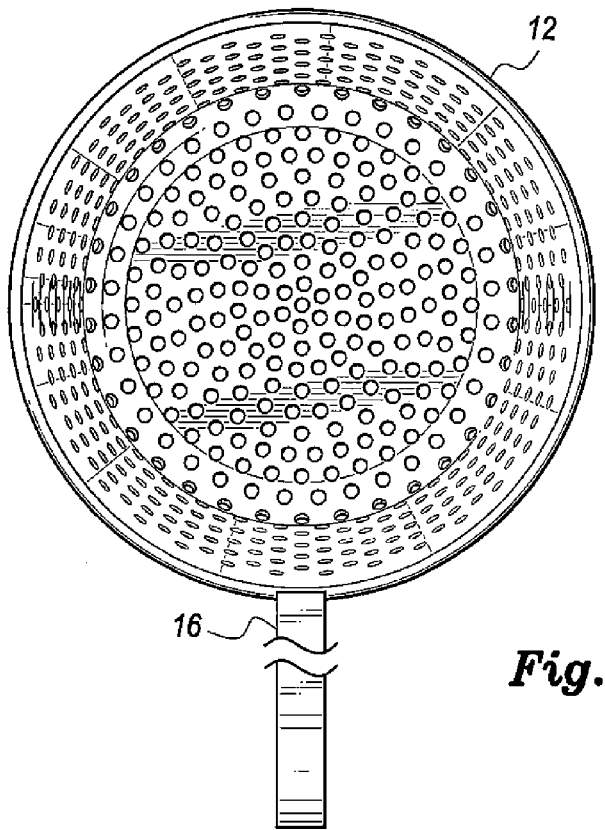
FIG. 3 is a top view of a perforated food ladle according to the present invention.

Referring to FIGS. 1-5, the perforated food ladle 10 comprises a bowl member 12 sized to contain approximately one quart of a liquid-solid mixture of food F to be panned-up from food container C. The bowl 12 is provided with perforations 14 throughout its bottom and peripheral walls to permit liquids to separate from solids during the panning-up procedure. An elongate handle 16 has a lower end 16a attached to the outer surface of bowl 12. The upper end of handle 16 terminates in a bend or hook 16b, which allows the utensil to be hung for storage when not in use. Vertically arranged indicia in the form of raised markings 18 are disposed on the outer surface of the bowl to indicate units of bowl capacity. It should be noted that other forms of indicators (numbers, letters, etc.) could be employed if desired. Although stainless steel is preferred, the utensil may be fabricated from other suitable material if desired. The one-quart capacity of the bowl has been determined to be the optimum size for handling and distribution when panning-up larger quantities of food.

Figure 4:
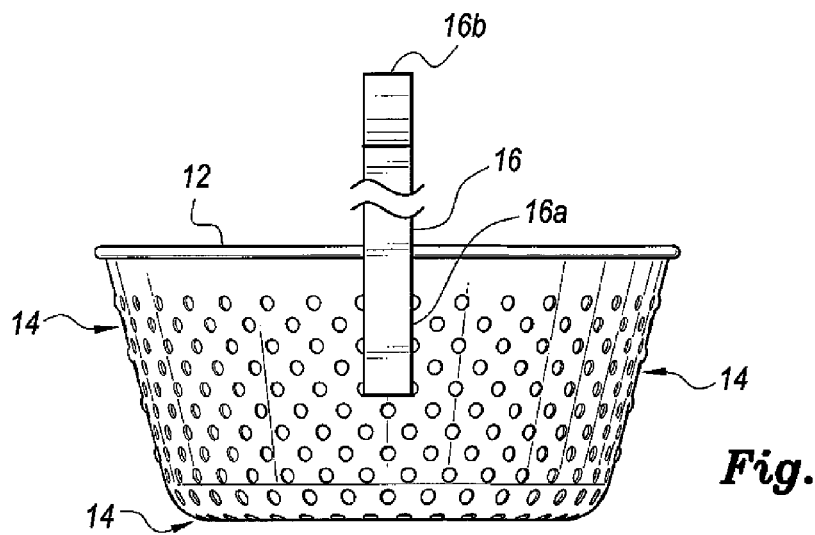
FIG. 4 is a rear view of a perforated food ladle according to the present invention.
Figure 5:
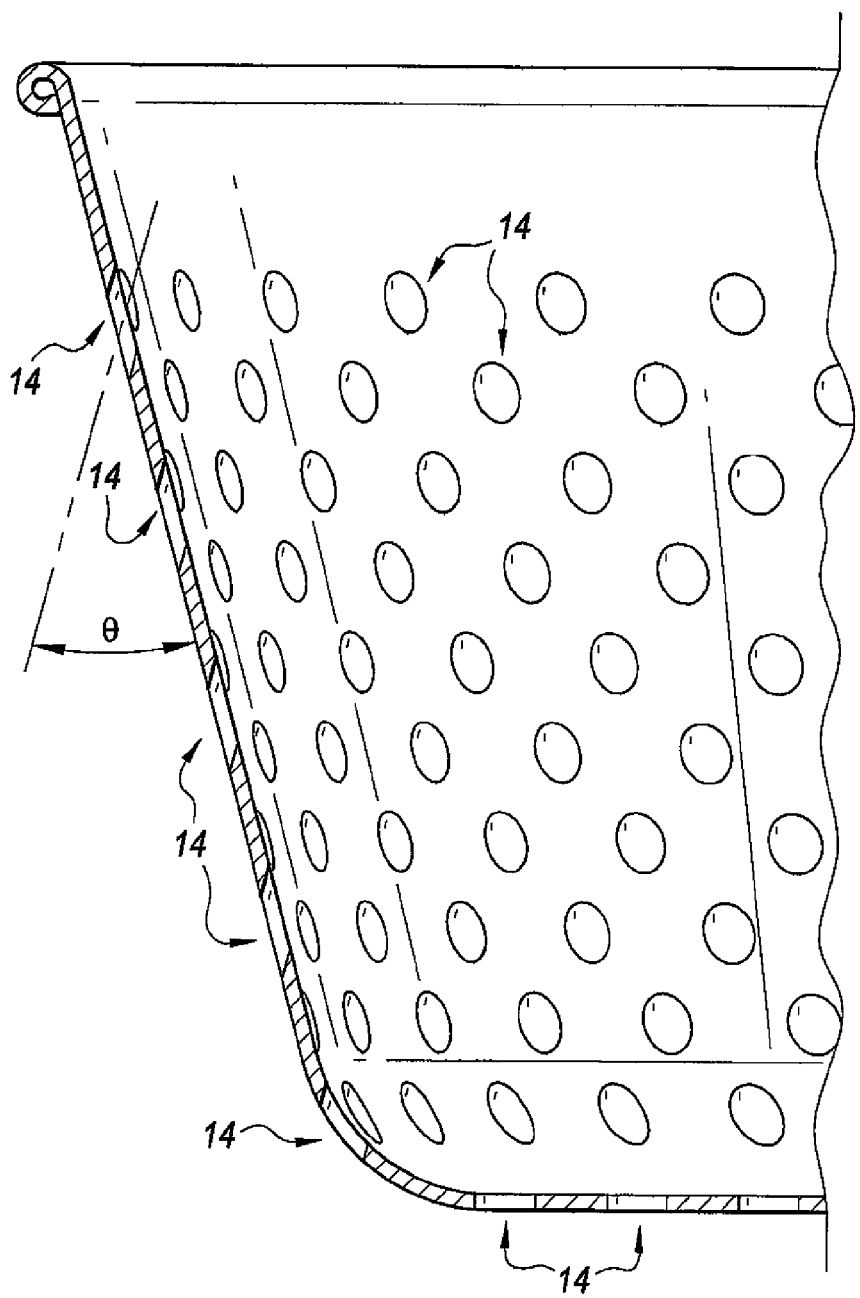
FIG. 5 is a view of a perforated food ladle depicting the angled perforations of the present invention.

Referring to FIG. 5, the perforated food ladle 10 comprises a bowl member 12 sized to contain approximately one quart of a liquid-solid mixture of food F to be panned-up from food container C. The bowl 12 is provided with perforations 14 throughout its bottom and peripheral walls to permit liquids to separate from solids during the panning-up procedure. As shown in FIG. 5, the perforations 14 are disposed at an angle to the peripheral bowl member 12. The angle $\theta$ is preferably in the range of 20-45°. The angle $\theta$ permits the liquids to separate from the solids at a rapid and consistent rate as compared to the conventional perforations at 90°. The angle is selected to ensure minimum gravitational resistance to the flow of the liquid. That is, during the panning-up procedure, perforations formed at 90° provide the maximum resistance to flow since the flow path is perpendicular to the gravitational force, whereas perforations formed in the range of 20-45° provide minimal resistance to the flow since the flow is more aligned with the gravitational force acting on the liquid. The bowl 12 has a flat bottom wall and a peripheral wall extending upwardly from the bottom wall and terminating at a continuous upper rim, the peripheral wall having an outer surface. The peripheral wall extending upwardly can be straight or angled as depicted in FIGS. 4 and 5.

It is to be understood that the present invention is not limited to the embodiment described above, but encompasses any and all embodiments within the scope of the following claims.

I claim:

1. A perforated food ladle for separating liquids from a solid-liquid mixture of food, the ladle comprising:

a bowl having a flat bottom wall and a peripheral wall extending upwardly from the bottom wall and terminating at a continuous upper rim, the peripheral wall having an outer surface, the bowl having a capacity to contain approximately one quart of the solid-liquid mixture, the bottom wall and the peripheral wall having a plurality of perforations extending through a majority of the bottom wall and a majority of the peripheral wall to permit straining liquid from the solid-liquid food mixture, wherein the perforations located in the peripheral wall are disposed at an angle of 20-45° to the peripheral wall, the bowl is fabricated solely from stainless steel;

an elongate handle having an upper end and a lower end, the lower end being attached solely to the outer surface of the peripheral wall and extending upwardly therefrom, the upper end forming a hook; and raised markings vertically arranged on the outer surface of the peripheral wall, the indicia providing graduation marks in units of bowl capacity.

\* \* \* \* \*